No. 631,927. Patented Aug. 29, 1899.
J. A. BROKER.
EYEGLASS GUARD.
(Application filed July 29, 1898.)
(No Model.)
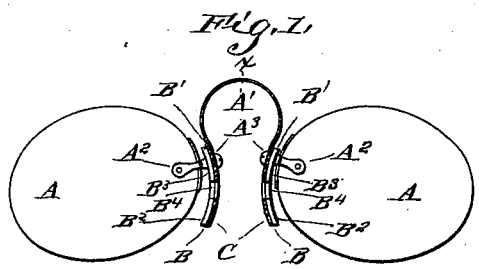
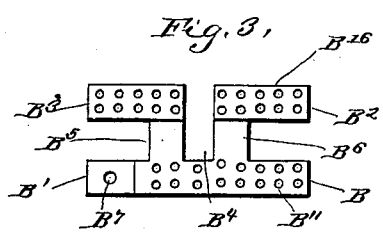
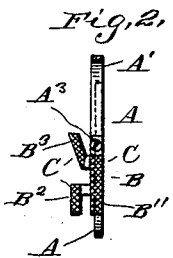
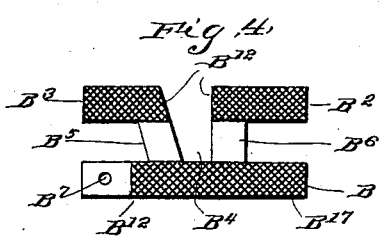
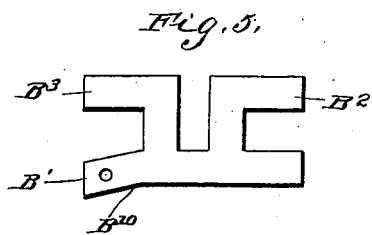
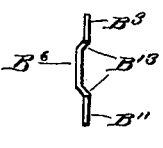
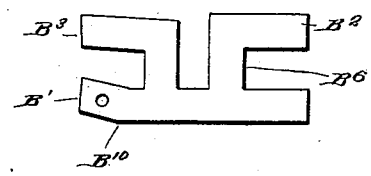
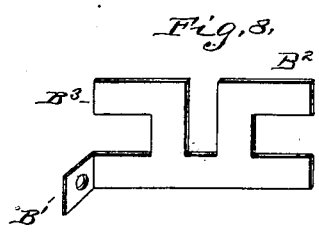
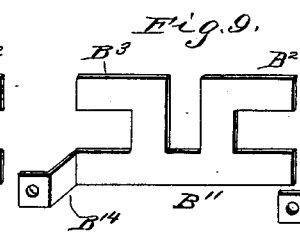
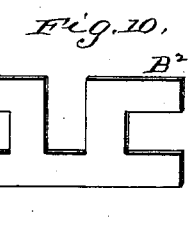
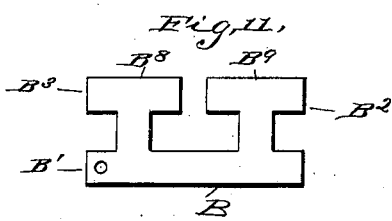
Witnesses:
L. Hensel.
C. W. Handy.
Inventor:
John A. Broker
By E. R. Thomas
atty.
THE NORRIS PETERS CO., PHOTO-LITHO., WASHINGTON, D. C.

UNITED STATES PATENT OFFICE.

JOHN A. BROKER, OF NEW YORK, N. Y.

EYEGLASS-GUARD.

SPECIFICATION forming part of Letters Patent No. 631,927, dated August 29, 1899.

Application filed July 29, 1898. Serial No. 687,197. (No model.)

*To all whom it may concern:*

Be it known that I, JOHN A. BROKER, a citizen of the United States, and a resident of the city, county, and State of New York, have invented a new and useful Improvement in Eyeglass-Guards, of which the following is a specification.

The object of this invention is to provide eyeglasses with a guard adapted to be readily adjusted to the shape of the nose.

The invention consists in a guard having a main bearing and two reversed auxiliary bearings, forming triplet bearings, angles, and offsets of the guard-bearings.

Figure 1 represents a pair of eyeglasses provided with the improved guard. Fig. 2 is an inner edge view on line $x$ of Fig. 1. Fig. 3 is a guard having its bearing-surface perforated. Fig. 4 shows the main bearing provided with angle and right-angle arms. Fig. 5 shows the end of the main bearing bent out at the point which comes in contact with the lens-strap. Fig. 6 shows one end of the main bearing bent inward. Fig. 7 is an end view of Fig. 4. Figs. 8, 9, and 10 show the bend and offset of the guard, and Fig. 11 shows a modified form of the bearings.

A, Fig. 1, represents the lenses of an eyeglass, which are supported and held by the straps $A^2$.

$A'$ is an ordinary eyeglass-spring and with the guards is secured to the inner ends of the straps $A^2$ by aid of the screws $A^3$.

C C are shell or cork surfaces riveted to the main bearing $B^{11}$ and to the auxiliary bearings $B^2$ and $B^3$. As these shell or cork bearings are common to all eyeglasses it is not deemed necessary to show them in all the figures.

B in the several figures represents the guard of an eyeglass formed from thin elastic metal and provided with an upper and lower L part integral or otherwise secured to the main bearing $B^{11}$. These L parts are formed by arms $B^5$ and $B^6$, which have bearings $B^2$ and $B^3$. The said bearing $B^3$ extends upward and $B^2$ downward along the nose. These bearings $B^2$ and $B^3$ have long surfaces which can be bent in and outward to conform to the shape of the nose. This could not be done providing they were round, as in common use. The bearings $B^3$ of the upper L part, as shown in Fig. 3, in practice will be formed at an angle to the main bearing $B^{11}$ that it may extend upward and inward along the nose and its free end rest at or near the base of the nose between the eyes. The bearing $B^2$ extends downward and rests near the base of the nose, while the bearing $B^{11}$ rests near the outer or ridge part.

The space $B^4$ in the several figures may be of any suitable width, as it is for permitting the parts $B^5$ and $B^6$ to be bent in any angle independent of each other.

The several bends and offsets at $B'$ and $B^{14}$, also $B^{15}$, as shown in Fig. 8, are for the purpose of adjusting the lenses nearer or farther apart that the center of the lenses may come directly opposite the pupils of the eyes.

The auxiliary bearings $B^3$, Figs. 8, 9, and 10, may be of different lengths, as shown, and formed at an obtuse angle to the main bearing $B^{11}$. By this plan the eyeglasses can be set more or less high on the nose.

That the shell or cork C may be dispensed with I perforate the integral bearings $B^2$, $B^3$, and $B^{11}$, as shown in Fig. 3 at $B^{16}$, or they may be knurled, as at $B^{17}$, Fig. 4. That only the knurled or perforated parts of the guard may come in contact with the nose the surface between the bearings is bent outward, as shown at $B^{13}$, Fig. 7.

The hole $B^7$, Figs. 3 and 4, is for the purpose of receiving the screw $A^3$.

Having thus fully described my invention, what I claim as new, and desire to secure by Letters Patent, is—

1. In eyeglass-guards a main bearing $B^{11}$ having two reversed L parts provided with bearings $B^2$ and $B^3$, in combination with the straps $A^2$ for holding the lens A, as set forth.

2. In eyeglass-guards, a main bearing $B^{11}$ having two reversed L parts provided with bearings $B^2$ and $B^3$ and the offset $B^{13}$, in combination with the strap $A^2$ for holding the lens A, as set forth.

3. In an eyeglass-guard a main bearing $B^{11}$ provided with an offset $B^{14}$, the two reversed L parts having bearings $B^2$ and $B^3$ in combination with the strap $A^2$ for holding the lens A, as set forth.

In testimony whereof I affix my signature in presence of two witnesses.

JOHN A. BROKER.

Witnesses:
E. T. THOMAS,
JOHN F. EGGERS.